US012024430B2

(12) United States Patent
Al-Huwaider

(10) Patent No.: US 12,024,430 B2
(45) Date of Patent: Jul. 2, 2024

(54) INTEGRATION OF POWER GENERATION WITH METHANE REFORM

(71) Applicant: Saudi Arabian Oil Company, Dhahran (SA)

(72) Inventor: Mustafa A. Al-Huwaider, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/310,269

(22) Filed: May 1, 2023

(65) Prior Publication Data

US 2023/0264953 A1    Aug. 24, 2023

Related U.S. Application Data

(62) Division of application No. 17/481,857, filed on Sep. 22, 2021, now Pat. No. 11,679,977.

(51) Int. Cl.
   *F01K 23/10*   (2006.01)
   *C01B 3/38*    (2006.01)
   (Continued)

(52) U.S. Cl.
   CPC ............... *C01B 3/384* (2013.01); *F01K 7/16* (2013.01); *F01K 13/02* (2013.01); *F01K 23/10* (2013.01);
   (Continued)

(58) Field of Classification Search
   CPC ............ C01B 3/384; C01B 2203/0233; C01B 2203/0244; C01B 2203/062;
   (Continued)

(56) References Cited

U.S. PATENT DOCUMENTS

| 5,595,059 A | * | 1/1997 | Huber | F01K 23/10 60/39.12 |
| 6,223,519 B1 | * | 5/2001 | Basu | F01K 23/10 60/39.12 |

(Continued)

FOREIGN PATENT DOCUMENTS

WO    WO-2015000618 A1 *  1/2015  ............... C01B 3/38

OTHER PUBLICATIONS aqua-calc.com [online], "Volume of liquid ammonia," available on or before Nov. 1, 2014 via Internet Archive, Wayback Machine URL <https://web.archive.org/web/20141101074746/https://www.aqua-calc.com/calculate/weight-to-volume/substance/liquid-blank-ammonia>, retrieved on Sep. 17, 2021, retrieved from URL <https://www.aqua-calc.com/calculate/weight-to-volume/substance/liquid-blank-ammonia>, 3 pages.

(Continued)

*Primary Examiner* — Jesse S Bogue
(74) *Attorney, Agent, or Firm* — Fish & Richardson P.C.

(57) ABSTRACT

The system includes a methane reformer, a combined cycle power generator, and a switch. The reformer is configured to react methane with steam. The combined cycle power generator includes a steam turbine, a gas turbine, a power generator, and a water boiler. The steam turbine is configured to rotate in response to receiving steam. The gas turbine is configured to rotate in response to receiving a mixture of fuel and air. The power generator is configured to convert rotational energy from the steam turbine and the gas turbine into electricity. In a first position, the switch is configured to direct exhaust from the gas turbine to the reformer, thereby providing heat to the reformer. In a second position, the switch is configured to direct exhaust from the gas turbine to the water boiler, thereby providing heat to the water boiler to generate steam.

6 Claims, 6 Drawing Sheets

(51) Int. Cl.
*F01K 7/16* (2006.01)
*F01K 13/02* (2006.01)

(52) U.S. Cl.
CPC .............. *C01B 2203/0233* (2013.01); *C01B 2203/0244* (2013.01); *C01B 2203/062* (2013.01); *C01B 2203/068* (2013.01); *C01B 2203/1241* (2013.01); *C01B 2203/14* (2013.01); *F05D 2220/722* (2013.01)

(58) Field of Classification Search
CPC ...... C01B 2203/068; C01B 2203/1241; C01B 2203/14; F01K 7/16; F01K 13/02; F01K 23/10; F05D 2220/722
See application file for complete search history.

(56) References Cited

U.S. PATENT DOCUMENTS

| | | | | |
|---|---|---|---|---|
| 6,863,879 | B2* | 3/2005 | Rojey | C01B 3/38 60/671 |
| 7,870,717 | B2* | 1/2011 | MacKnight | F02C 3/22 60/39.12 |
| 2008/0155984 | A1* | 7/2008 | Liu | C01B 3/48 422/198 |
| 2014/0165572 | A1* | 6/2014 | Pang | F01K 3/12 60/736 |
| 2015/0000249 | A1* | 1/2015 | Carroni | B01D 53/1475 60/39.182 |
| 2018/0119618 | A1* | 5/2018 | Erickson | F02C 7/224 |
| 2021/0363899 | A1* | 11/2021 | Moser | F01K 23/10 |

OTHER PUBLICATIONS araner.com [online], "What makes combined cycle power plants so efficient," 2021, retrieved on Sep. 17, 2021, retrieved from URL <https://www.araner.com/blog/combined-cycle-power-plants>, 10 pages.
Bockmiller et al., "University of California strategies for decarbonization: Replacing Natural Gas TomKat Natural Gas Exit Strategies Working Group Report to the TomKat Foundation," University of California, Feb. 2018, 101 pages.
Collodi et al., "Hydrogen Production via Steam Reforming with CO2 Capture," Chemical Engineering Transactions, Apr. 2010, 19:37-42, 6 pages.
Huang, "Impact of rising natural gas prices on U.S. ammonia supply," A Report from the Economic Research Service, United States Department of Agriculture, Aug. 2007, 19 pages.
ipieca.org [online], "Open cycle gas turbines," Feb. 2014, retrieved on Sep. 17, 2021, retrieved from URL <https://www.ipieca.org/resources/energy-efficiency-solutions/power-and-heat-generation/open-cycle-gas-turbines/>, 12 pages.
powerengineeringint.com [online], "Gas turbines breaking the 60% efficiency barrier," Power Engineering International, May 2010, retrieved on Sep. 21, 2021, retrieved from URL <https://www.powerengineeringint.com/coal-fired/equipment-coal-fired/gas-turbines-breaking/>, 6 pages.
Rajesh et al., "Thermal efficiency of combined cycle power plant," International Journal of Engineering and Management Research, Jun. 2018, 8(3):229-234, 7 pages.
Shagdar et al., "Process analysis of solar steam reforming of methane for producing low-carbon hydrogen," Royal Society of Chemistry, 2020, 10:12582, 16 pages.
Supple, "Units & Conversions Fact Sheet," Massachusetts Institute of Technology Energy Club, Apr. 2007, 2 pages.
web.mit.edu [online], "8.7 Combined cycles in stationary gas turbine for power production," available on or before May 11, 2021, via Internet Archive, Wayback Machine URL <https://web.archive.org/web/20120915000000*/http://web.mit.edu/16.unified/www/SPRING/thermodynamics/notes/node67.html>, retrieved on Sep. 16, 2021, retrieved from URL <http://web.mit.edu/16.unified/www/SPRING/thermodynamics/notes/node67.html>, 3 pages.
Welch et al., "Improving the flexibility and efficiency of gas turbine-based distributed power plants," Power Engineering, Sep. 2015, 14 pages.
Wesenberg, "Gas heated steam reformer modelling," Doctoral thesis for the degree of doktor ingeniør Trondheim, Norwegian University of Science and Technology, Apr. 2006, 210 pages.

\* cited by examiner

INTEGRATION OF POWER GENERATION WITH METHANE REFORM

CROSS-REFERENCE TO RELATED PATENT APPLICATIONS

This application is a divisional of U.S. patent application Ser. No. 17/481,857, filed Sep. 22, 2021, the contents of which are incorporated by reference herein.

TECHNICAL FIELD

This disclosure relates to integrating power generation with methane reforming.

BACKGROUND

Methane reforming involves the use of a catalyst to produce hydrogen from methane. Steam methane reforming is a type of methane reforming that reacts methane with steam in the presence of a catalyst to produce carbon monoxide and hydrogen. The reaction associated with steam methane reforming is endothermic and requires heat to maintain desirable reaction conditions. Fuel is often burned to provide a source of heat.

SUMMARY

This disclosure describes technologies relating to integrating power generation with methane reforming in ammonia production to improve thermal efficiency.

Certain aspects of the subject matter described can be implemented as a system. The system includes a reformer, a combined cycle power generator, and a switch. The reformer is configured to react methane with steam to produce a reformer product stream that includes carbon monoxide and hydrogen. The combined cycle power generator is fluidically coupled to the reformer. The combined cycle power generator includes a steam turbine, a gas turbine, a power generator, and a water boiler. The steam turbine is configured to rotate in response to receiving steam. The gas turbine is configured to rotate in response to receiving a mixture of fuel and air. The power generator is coupled to the steam turbine and the gas turbine. The power generator is configured to convert rotational energy from the steam turbine and rotational energy from the gas turbine into electricity. The water boiler is fluidically coupled to the steam turbine. The water boiler is configured to generate steam from water in response to receiving heat. The switch can adjust between a first position and a second position. In the first position, the switch is configured to direct exhaust from the gas turbine to the reformer, thereby providing heat to the reformer. In the second position, the switch is configured to direct exhaust from the gas turbine to the water boiler, thereby providing heat to the water boiler.

This, and other aspects, can include one or more of the following features. The system can include an ammonia production system. The reformer can be a part of the ammonia production system. The reformer can include a reformer reactor and a second water boiler. The reformer reactor can be configured to discharge the reformer product stream. The reformer product stream can include methane. The second water boiler can be configured to generate steam in response to receiving the reformer product stream. The ammonia production system can include a secondary reformer in fluid communication with the reformer reactor. The secondary reformer can be configured to receive and react the reformer product stream and a heated stream to produce a second reformer product stream. The heated stream can include oxygen, nitrogen, or any combination of these. The second reformer product stream can include carbon monoxide, nitrogen, hydrogen, methane, or any combination of these. The ammonia production system can include a carbon monoxide converter. The carbon monoxide converter can be in fluid communication with the secondary reformer. The carbon monoxide converter can be configured to receive and react the second reformer product stream and steam to produce a converter product stream. The converter product stream can include carbon dioxide, hydrogen, nitrogen, water, or any combination of these. The ammonia production system can include a first condenser. The first condenser can be in fluid communication with the carbon monoxide converter. The first condenser can be configured to receive and cool the converter product stream. The first condenser can be configured to discharge a liquid portion of the converter product stream and a vapor portion of the converter product stream. The liquid portion of the converter product stream can include water. The vapor portion of the converter product stream can include carbon dioxide, hydrogen, nitrogen, or any combination of these. The ammonia production system can include a first compressor. The first compressor can be in fluid communication with the first condenser. The first compressor can be configured to receive and increase a pressure of the vapor portion of the converter product stream. The ammonia production system can include a carbon dioxide absorber in fluid communication with the first compressor. The carbon dioxide absorber can be configured to contact water with the vapor portion of the converter product stream from the first compressor to facilitate transfer of carbon dioxide from the vapor portion of the converter product stream to the water. The carbon dioxide absorber can be configured to discharge a water stream and an absorber product stream. The water stream can include carbon dioxide. The absorber product stream can include hydrogen and nitrogen. The ammonia production system can include a second compressor. The second compressor can be in fluid communication with the carbon dioxide absorber. The second compressor can be configured to receive and increase a pressure of the absorber product stream. The ammonia production system can include a pre-heater. The pre-heater can be in fluid communication with the second compressor. The pre-heater can be configured to receive and increase a temperature of the absorber product stream. The ammonia production system can include an ammonia reactor. The ammonia reactor can be in fluid communication with the pre-heater. The ammonia reactor can be configured to receive the absorber product stream and react the hydrogen and nitrogen of the absorber product stream to produce an ammonia reactor product stream. The ammonia reactor product stream can include ammonia. The ammonia production system can include a second condenser. The second condenser can be in fluid communication with the ammonia reactor. The second condenser can be configured to receive and cool the ammonia reactor product stream. The ammonia reactor product stream can include hydrogen, nitrogen, or any combination of these. The second condenser can be configured to discharge a liquid portion of the ammonia reactor product stream and a vapor portion of the ammonia reactor product stream. The liquid portion of the ammonia reactor product stream can include ammonia. The vapor portion of the ammonia reactor product stream can hydrogen, nitrogen, or any combination of these. The ammonia production system can include an ammonia storage vessel. The ammonia storage vessel can be in fluid communication with the second condenser. The ammonia storage vessel can be configured to receive and store the liquid portion of the ammonia reactor product stream. The ammonia production system can include a third compressor. The third compressor can be in fluid communication with the second condenser. The third compressor can be configured to receive and increase a pressure of the vapor portion of the ammonia reactor product stream. The pre-heater can be in fluid communication with the third compressor. The pre-heater can be configured to receive and increase a temperature of the vapor portion of the ammonia reactor product stream, such that the vapor portion of the ammonia reactor product stream can be recycled to the ammonia reactor. The switch can include a baffle configured to swing between the first position and the second position. The switch can include a first gate and a second gate. In the first position, the first gate can be closed and configured to obstruct a flow path between the gas turbine and the water boiler to prevent fluid from flowing from the gas turbine to the water boiler. In the first position, the second gate can be open and configured to allow fluid to flow in a flow path between the gas turbine and the reformer. In the second position, the first gate can be open and configured to allow fluid to flow in the flow path between the gas turbine and the water boiler. In the second position, the second gate can be closed and configured to obstruct the flow path between the gas turbine and the reformer to prevent fluid from flowing from the gas turbine to the reformer.

Certain aspects of the subject matter described can be implemented as a method. Methane and steam are flowed to a reformer. The methane and steam are reacted by the reformer to produce a reformer product stream. The reformer product stream includes carbon monoxide and hydrogen. Steam is flowed to a steam turbine, thereby causing the steam turbine to rotate. Electricity is generated by a power generator coupled to the steam turbine, in response to rotation of the steam turbine. Fuel and air are flowed to a gas turbine, thereby causing the gas turbine to rotate. Electricity is generated by the power generator coupled to the gas turbine, in response to rotation of the gas turbine. Exhaust from the gas turbine is directed to the reformer by a switch in a first position. Directing exhaust from the gas turbine to the reformer provides heat to the reformer.

This, and other aspects, can include one or more of the following features. The switch can be adjusted from the first position to a second position, thereby directing (by the switch in the second position) exhaust from the gas turbine to a water boiler to provide heat to the water boiler. Steam can be generated by the water boiler in response to receiving heat via the exhaust from the gas turbine. The reformer product can include methane. The reformer can include a reformer reactor and a second water boiler. The reformer product stream can be flowed from the reformer reactor to the second water boiler to provide heat to the second water boiler. Steam can be generated by the second water boiler in response to receiving heat via the reformer product stream from the reformer reactor. The reformer product stream and a heated stream can be flowed to a secondary reformer. The heated stream can include oxygen, nitrogen, or any combination of these. The reformer product stream and the heated stream can be reacted by the secondary reformer to produce a second reformer product stream. The second reformer product stream can include carbon monoxide, nitrogen, hydrogen, methane, or any combination of these. The second reformer product stream and steam can be flowed to a carbon monoxide converter. The second reformer product stream and steam can be reacted by the carbon monoxide converter to produce a converter product stream. The converter product stream can include carbon dioxide, hydrogen, nitrogen, water, or any combination of these. The converter product stream can be flowed to a first condenser. The converter product stream can be cooled by the first condenser to separate a liquid portion of the converter product stream from a vapor portion of the converter product stream. The liquid portion of the converter product stream can include water. The vapor portion of the converter product stream can include carbon dioxide, hydrogen, nitrogen, or any combination of these. The vapor portion of the converter product stream can be flowed to a first compressor. A pressure of the vapor portion of the converter product stream can be increased by the first compressor. Water and the vapor portion of the converter product stream can be flowed to a carbon dioxide absorber. Water can be contacted with the vapor portion of the converter product stream by the carbon dioxide absorber to facilitate transfer of carbon dioxide from the vapor portion of the converter product stream to the water. A water stream can be discharged by the carbon dioxide absorber. The water stream can include carbon dioxide, for example, transferred from the vapor portion of the converter product stream. An absorber product stream can be discharged by the carbon dioxide absorber. The absorber product stream can include hydrogen and nitrogen. The absorber product stream can be flowed to a second compressor. A pressure of the absorber product stream can be increased by the second compressor. The absorber product stream can be flowed to a pre-heater. A temperature of the absorber product stream can be increased by the pre-heater. The absorber product stream can be flowed to an ammonia reactor. The hydrogen and nitrogen of the absorber product stream can be reacted by the ammonia reactor to produce an ammonia reactor product stream. The ammonia reactor product stream can include ammonia. The ammonia reactor product stream can be flowed to a second condenser. The ammonia reactor product stream can include hydrogen, nitrogen, or any combination of these. The ammonia reactor product stream can be cooled by the second condenser to separate a liquid portion of the ammonia reactor product stream from a vapor portion of the ammonia reactor product stream. The liquid portion of the ammonia reactor product stream can include ammonia. The vapor portion of the ammonia reactor product stream can include hydrogen, nitrogen, or any combination of these. The liquid portion of the ammonia reactor product stream can be flowed to an ammonia storage vessel. The vapor portion of the ammonia reactor product stream can be flowed to a third compressor. A pressure of the vapor portion of the ammonia reactor product stream can be increased by the third compressor. The vapor portion of the ammonia reactor product stream can be flowed to the pre-heater. A temperature of the vapor portion of the ammonia reactor product stream can be increased by the pre-heater. The vapor portion of the ammonia reactor product stream can be recycled to the ammonia reactor. The switch can include a baffle. Adjusting a position of the switch can include swinging the baffle between the first position and the second position. The switch can include a first gate and a second gate. Adjusting the switch to the first position can include closing the first gate to obstruct a flow path between the gas turbine and the water boiler to prevent fluid from flowing from the gas turbine to the water boiler. Adjusting the switch to the first position can include opening the second gate to allow fluid to flow in a flow path between the gas turbine and the reformer. Adjusting the switch to the second position can include opening the first gate to allow fluid to flow in the flow path between the gas turbine and the water boiler. Adjusting the switch to the second position can include closing the second gate to obstruct the flow path between the gas turbine and the reformer to prevent fluid from flowing from the gas turbine to the reformer.

Certain aspects of the subject matter described can be implemented as a system. The system includes a reformer, a gas turbine, a power generator, a flowline, and a water boiler. The reformer is configured to react methane with steam to produce a reformer product stream. The reformer product stream includes carbon monoxide and hydrogen. The gas turbine is configured to rotate in response to receiving a mixture of fuel and air. The power generator is coupled to the gas turbine. The power generator is configured to convert rotational energy from the gas turbine into electricity. The flowline fluidically connects the reformer and the gas turbine. The flowline is configured to direct exhaust from the gas turbine to the reformer to provide heat to the reformer. The water boiler is disposed within the reformer. The water boiler is configured to receive heat from at least one of the reformer product stream or the exhaust from the gas turbine (for example, only the reformer product stream, only the exhaust, or both the reformer product stream and the exhaust) and use the received heat to generate steam.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure relates to ammonia production that integrates a power generation cycle with steam methane reforming in ammonia production. The power generation cycle includes a steam turbine, power generator, and a gas turbine that can share a common shaft. Exhaust from the gas turbine can provide heat to the steam methane reformer or a boiler that generates steam. The destination for the heat can be selected based on power demand (for example, the need for power in the form of electricity to perform operations). For example, during low power demand, the exhaust can be directed to the reformer, to improve thermal efficiency of the ammonia production process. For example, during high power demand, the exhaust can be directed to the boiler, to generate steam for the steam turbine to generate power. The subject matter described in this disclosure can be implemented in particular implementations, so as to realize one or more of the following advantages. The systems and methods described can be implemented to improve overall thermal efficiency of an integrated ammonia production and power generation process. The systems and methods described can be implemented to reduce carbon emissions of an integrated ammonia production and power generation process. The systems and methods described are flexible and can be adjusted to meet variable energy demands of a processing plant. For example, during periods of high power demand, the ammonia production and power generation processes can operate independently (that is, ammonia production process produces ammonia and power generation process generates power without direct cooperation with one another). In such operation, the overall thermal efficiency of the integrated process may decrease. As another example, during periods of low power demand, the ammonia production and power generation processes can be integrated and cooperate to produce ammonia and generate power. In such operation, the overall thermal efficiency of the integrated process may increase.

Figure 1A:
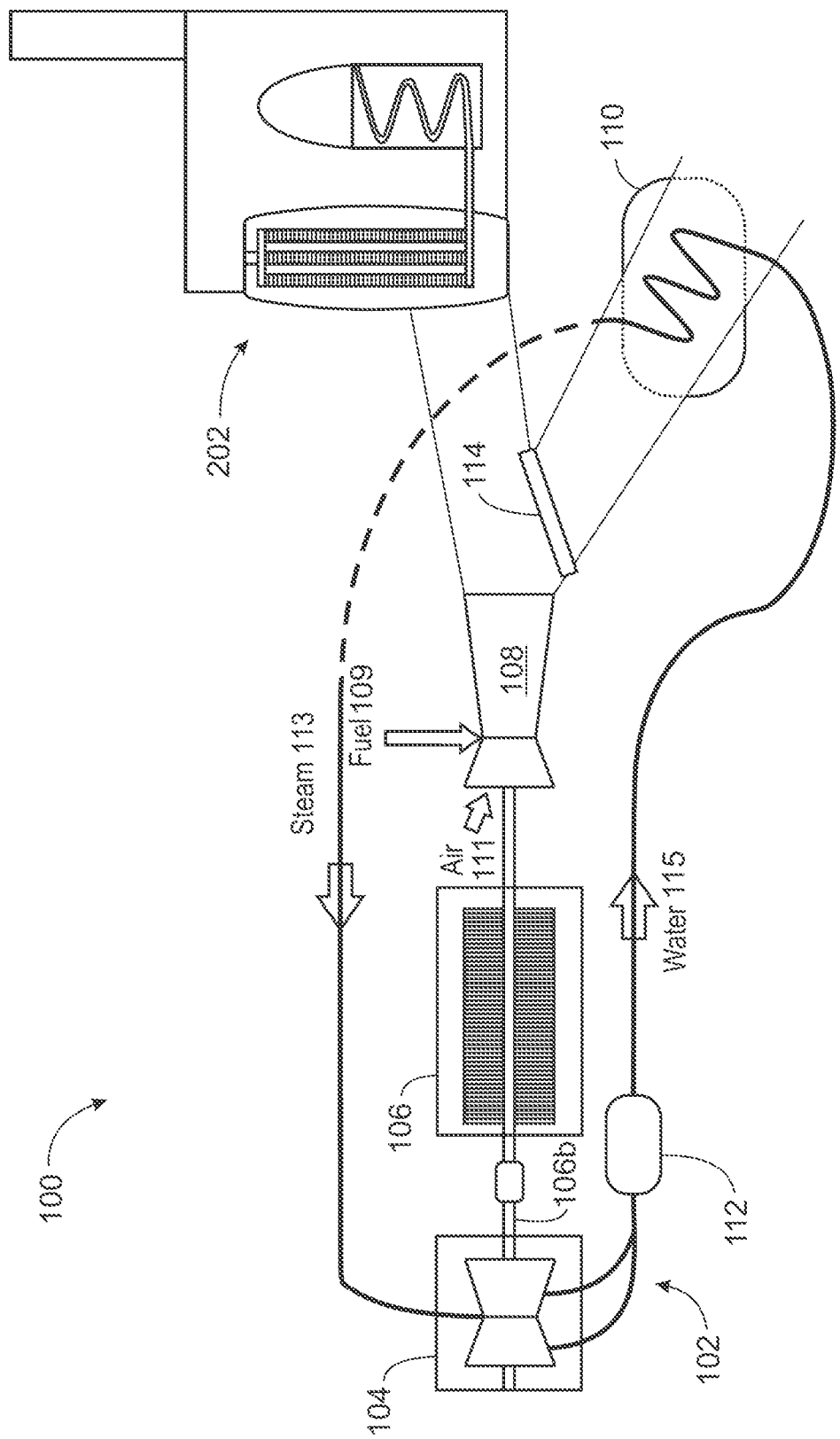
FIG. 1A is a schematic diagram of an example system including a combined cycle power generator integrated with a reformer, and a switch is in a first position.

FIG. 1A depicts a system 100 that includes a combined cycle power generator 102. The combined cycle power generator 102 includes a steam turbine 104, a power generator 106, a gas turbine 108, and a water boiler 110. The steam turbine 104 is coupled to the power generator 106 via a shaft 106b. As steam flows through the steam turbine 104, the steam turbine 104 rotates. The power generator 106 converts the rotational energy of the steam turbine 104 into electricity. The gas turbine 108 is coupled to the power generator 106 via the shaft 106b. As gas (for example, a mixture of fuel gas 109 and air 111) flows through the gas turbine 108, the gas turbine 108 rotates. In some implementations, the gas that flows to the gas turbine 108 is compressed (for example, by a compressor) to increase the pressure of the gas. In some implementations, the gas flowing through the gas turbine 108 is ignited to increase to temperature of the gas. The power generator 106 converts the rotational energy of the gas turbine 108 into electricity. In some implementations, at least a portion of the rotational energy of the gas turbine 108 is used to compress the gas upstream of the gas turbine 108. For example, at least a portion of the shaft work produced by the gas turbine 108 is used to drive the compressor. The shaft 106b can be a single shaft or multiple shafts coupled together end-to-end.

The water boiler 110 can house water and generate steam from the water in response to receiving heat. In some implementations, the system 100 includes a steam loop. In such implementations, the system 100 includes a condenser 112. Steam 113 flows through the steam turbine 104 and then to the condenser 112. The condenser 112 removes heat from the steam 113 to produce liquid water 115. The water 115 flows to the water boiler 110 where it receives heat to generate steam. The steam generated by the water boiler 110 can be recycled back to the steam turbine 104 to complete the steam loop. In some implementations, the combined cycle power generator 102 provides heat to the water boiler 110 to generate steam. For example, the exhaust from the gas turbine 108 can be directed to the water boiler 110 to provide the heat necessary to generate the steam.

The combined cycle power generator 102 is integrated with a reformer 202. The reformer 202 can react methane with steam to produce a stream comprising carbon monoxide and hydrogen. The combined cycle power generator 102 is coupled to the reformer 202. The reformer 202 is also shown in FIG. 2 and is described in more detail later.

Figure 1B:
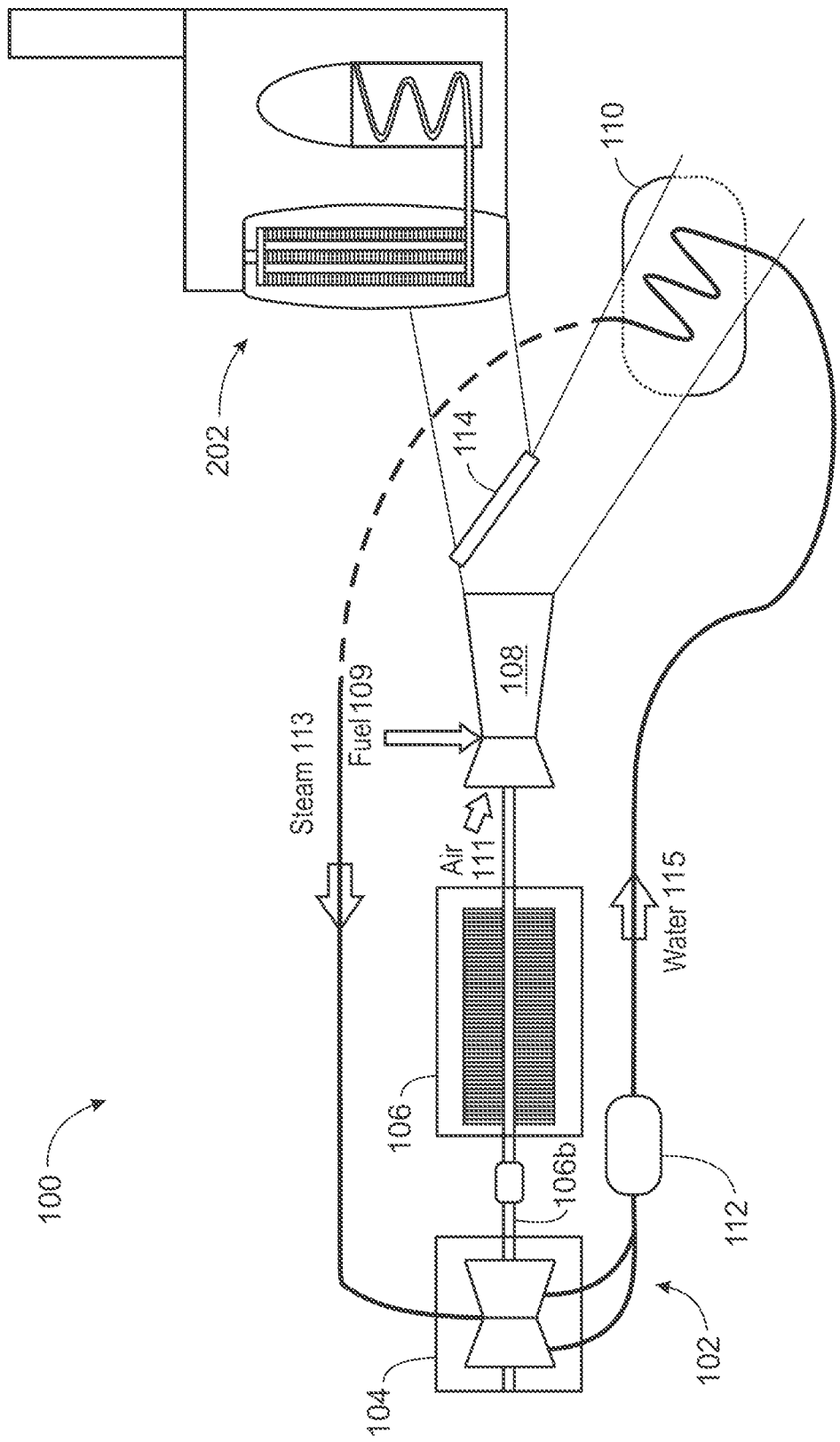
FIG. 1B is the system of FIG. 1A with the switch in a second position.

Referring back to FIG. 1A, the system 100 includes a switch 114. The switch 114 is adjustable between a first position and a second position. In the first position, the switch 114 is configured to direct exhaust from the gas turbine 108 to the reformer 202. In the second position, the switch 114 is configured to direct exhaust from the gas turbine 108 to the water boiler 110. In some implementations, the switch 114 is a baffle that swings between the first and second positions, depending on the desired destination (the reformer 202 or the water boiler 110) for the exhaust from the gas turbine 108. In some implementations, the switch 114 includes a first gate and a second gate. In the first position, the first gate is closed to obstruct a flow path between the gas turbine 108 and the water boiler 110. In the first position, the second gate is open to leave a flow path between the gas turbine 108 and the reformer 202 unobstructed. Thus, in the first position, the exhaust of the gas turbine 108 is directed to the reformer 202. In the second position, the first gate is open to leave the flow path between the gas turbine 108 and the water boiler 110 unobstructed. In the second position, the second gate is closed to obstruct the flow path between the gas turbine 108 and the reformer 202. Thus, in the second position, the exhaust of the gas turbine 108 is directed to the water boiler 110. The position of the switch 114 may be adjusted, for example, based on energy demands for the plant in which the system 100 is operating. For example, during high energy demand, the switch 114 can be adjusted to the second position to direct heat to the water boiler 110, which can facilitate the generation of electricity via the steam turbine 104. For example, during low energy demand, the switch 114 can switch to the first position to direct heat to the reformer 202, which can improve energy efficiency of the system 100. FIG. 1A shows the system 100 with the switch 114 in the first position, while FIG. 1B shows the system 100 with the switch 114 in the second position. In some cases, the switch 114 can be disposed in an intermediate position between the first and second positions, such that a first portion of the exhaust of the gas turbine 108 is directed to the reformer 202 while a second portion of the exhaust of the gas turbine 108 is directed to the water boiler 110. The amounts of the first and second portions of the exhaust of the gas turbine 108 flowing to the reformer 202 and the water boiler 110, respectively, can be adjusted by the switch 114 as desired.

Figure 1C:
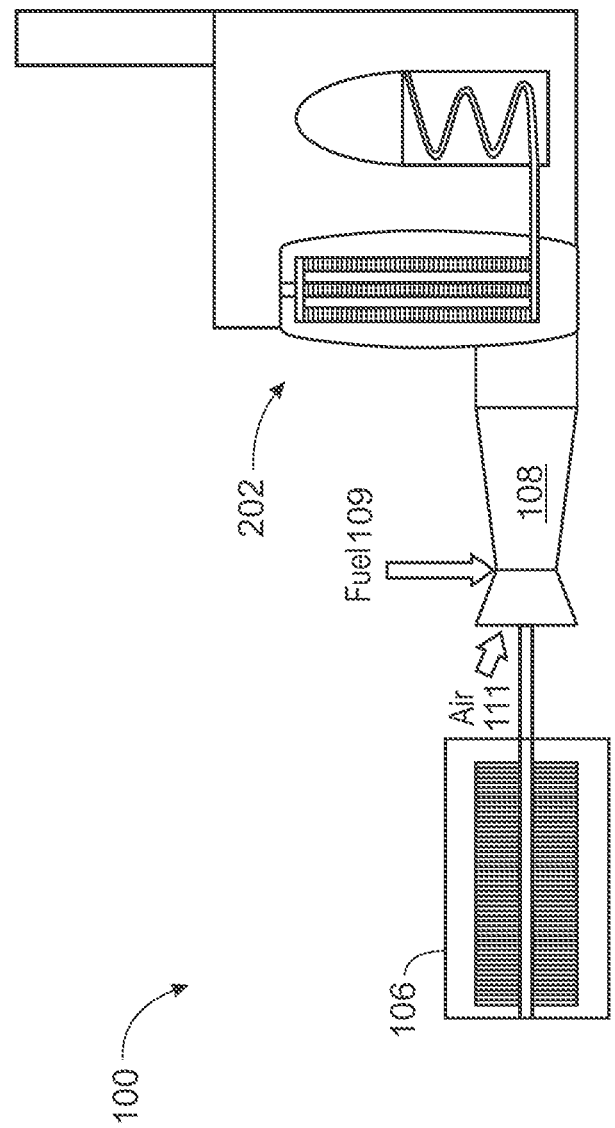
FIG. 1C is the system of FIG. 1A with some components omitted.

In some implementations, the steam turbine 104 can be disconnected from the combined cycle power generator 102, for example, by disconnecting the clutch connecting the steam turbine 104 to the power generator 106. For example, during periods of low power demand, the steam turbine 104 can be disconnected from the power generator 106, and the exhaust from the gas turbine 108 can flow to the reformer 202 and not to the water boiler 110. In some implementations, the steam loop is omitted entirely. That is, in some implementations, the system 100 does not include the steam turbine 104, the water boiler 110, and the condenser 112. In such implementations, the exhaust from the gas turbine 108 flows only to the reformer 202. FIG. 1C shows an implementation of system 100 in which the steam loop is omitted. The implementation of system 100 shown in FIG. 1C can be useful for configurations with low power demand. In some cases, the implementation of system 100 shown in FIG. 1C exhibits a maximum overall thermal efficiency in comparison to the implementations of system 100 shown in FIGS. 1A and 1B.

Figure 2:
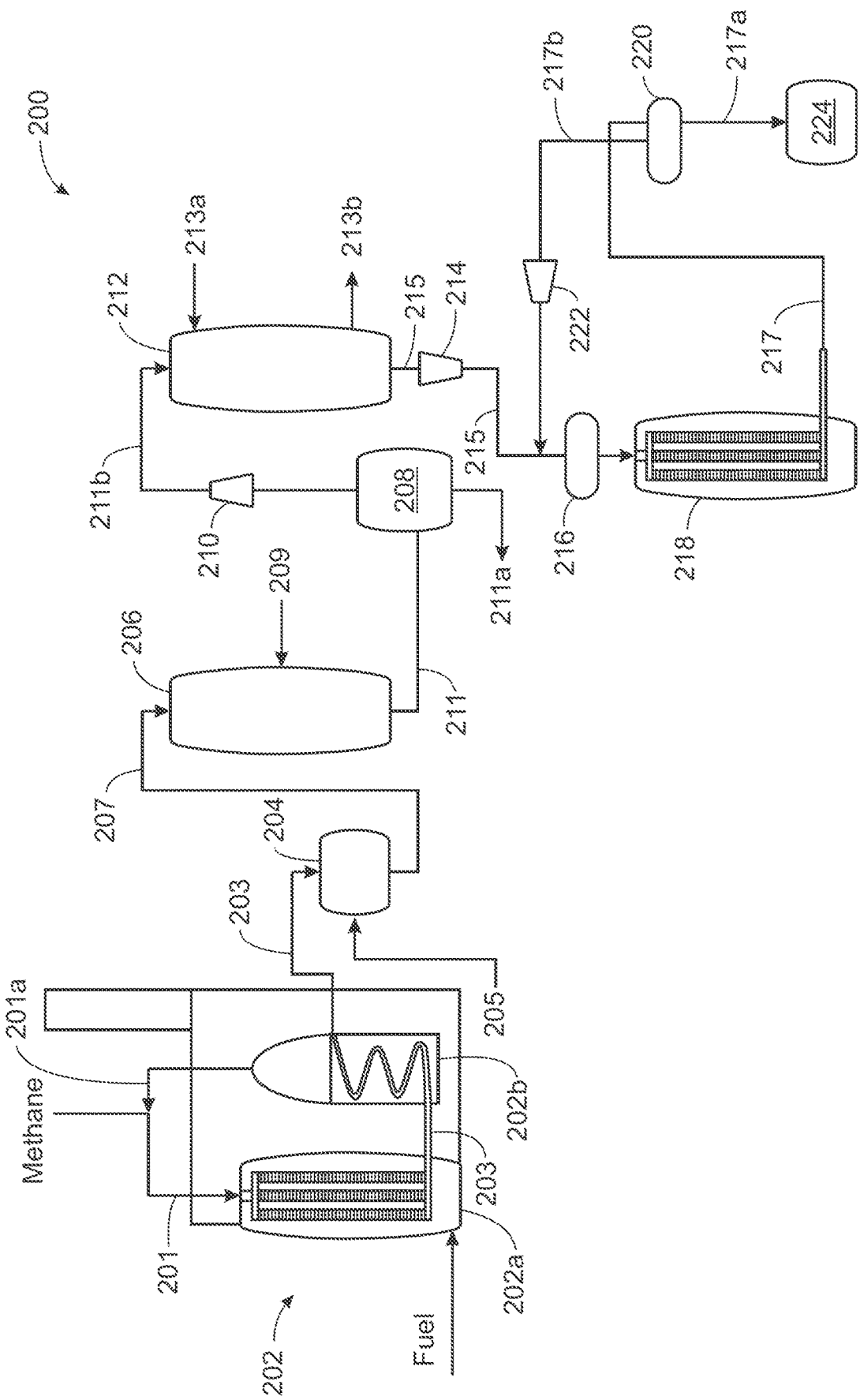
FIG. 2 is a schematic diagram of an example ammonia production system that includes the reformer of FIG. 1A.

FIG. 2 depicts an ammonia production system 200 that includes the reformer 202.

In some implementations, the system 100 (shown in FIGS. 1A and 1B) is integrated with the ammonia production system 200. The ammonia production system 200 includes the reformer 202, a secondary reformer 204, a carbon monoxide converter 206, a first condenser 208, a first compressor 210, a carbon dioxide absorber 212, a second compressor 214, a pre-heater 216, an ammonia reactor 218, a second condenser 220, a third compressor 222, and an ammonia storage vessel 224. The reformer 202 includes a reformer reactor 202a. In some implementations, the reformer 202 includes a boiler 202b.

A feed stream 201 that includes a mixture of methane and steam flows to the reformer reactor 202a. The reformer reactor 202a includes a catalyst (for example, a nickel-based catalyst) that accelerates the reaction between methane and steam to produce a reformer product stream 203 that includes hydrogen and carbon monoxide (Equation 1). In some cases, carbon dioxide is also produced and included in the reformer product stream 203. The reformer product stream 203 can also include unreacted methane. As shown by Equation 1, the reaction occurring within the reformer reactor 202a is endothermic. Heat is provided to the reformer reactor 202a to maintain a desired operating temperature. Heat can be provided to the reformer reactor 202a by combusting fuel (for example, methane) within the reformer reactor 202a, providing a hot gas (for example, the exhaust from the gas turbine 108), or a combination of both. As discussed previously with respect to system 100 shown in FIGS. 1A and 1B, integrating the combined cycle power generator 102 with the reformer 202 can, for example, improve thermal efficiency.

Referring back to FIG. 2, in some implementations, fuel (for example, methane) is combusted within the reformer reactor 202a to provide heat. The boiler 202b can be positioned within the reformer 202 (for example, within a housing of the reformer 202), such that the heat produced from combustion of the fuel within the reformer reactor 202a can be transferred from the hot gases flowing in the reformer 202 (and around the boiler 202b) to the boiler 202b. In some implementations, the reformer product stream 203 flows through the boiler 202b to provide additional heat. The heat provided to the boiler 202b is used to generate steam 201a. In some implementations, the steam 201a generated by the boiler 202b supplies at least a portion of the steam in the feed stream 201.

$$CH_4 + H_2O \rightarrow CO + 3H_2 \Delta H = +206 \text{ kJ/mol} \quad (1)$$

The reformer product stream 203 flows to the secondary reformer 204. A heated stream 205 also flows to the secondary reformer 204. The heated stream 205 includes oxygen. The heated stream 205 can include nitrogen. For example, the heated stream 205 can be heated air. At least a portion of the methane in the reformer product stream 203 reacts with oxygen in the secondary reformer 204 to produce additional hydrogen (Equation 2). A second reformer product stream 207 including carbon monoxide, nitrogen, and hydrogen exits the secondary reformer 204.

$$2CH_4 + O_2 \rightarrow 2CO + 4H_2 \Delta H = -71 \text{ kJ/mol} \quad (2)$$

The second reformer product stream 207 flows to the carbon monoxide converter 206. Steam 209 also flows to the carbon monoxide converter 206. A water-gas shift reaction occurs in the carbon monoxide converter 206 to convert carbon monoxide to carbon dioxide and produce additional hydrogen (Equation 3). A converter product stream 211 including carbon dioxide, hydrogen, and nitrogen exits the carbon monoxide converter 206. The converter product stream 211 can also include unreacted water.

$$CO + H_2O \rightarrow CO_2 + H_2 \Delta H = -41 \text{ kJ/mol} \quad (3)$$

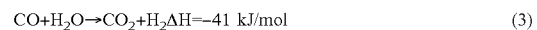

The converter product stream 211 flows to the first condenser 208. The first condenser 208 cools the converter product stream 211 and causes the steam in the converter product stream 211 to condense. The liquid portion 211a of the converter product stream 211 exits the first condenser 208. The vapor portion 211b of the converter product stream 211 exits the first condenser 208 and flows to the first compressor 210. The first compressor 210 increases the pressure of the vapor portion 211b.

The vapor portion 211b includes carbon dioxide, hydrogen, and nitrogen and flows to the carbon dioxide absorber 212. A water stream 213a is sprayed within the carbon dioxide absorber 212 to scrub carbon dioxide from the vapor portion 211b. In some implementations, the carbon dioxide absorber 212 includes a packed bed to improve mass transfer of carbon dioxide from the vapor portion 211b to the water stream 213a. The packed bed can include random packing, structured packing, or both. A water stream 213b that includes carbon dioxide (for example, dissolved) from the vapor portion 211b exits the carbon dioxide absorber 212. An absorber product stream 215 including hydrogen and nitrogen exits the carbon dioxide absorber 212.

The absorber product stream 215 flows to the second compressor 214. The second compressor 214 increases the pressure of the absorber product stream 215, such that the absorber product stream 215 has a desired operating pressure once it reaches the ammonia reactor 218. The absorber product stream 215 flows from the second compressor 214 to the pre-heater 216. The pre-heater 216 increases the temperature of the absorber product stream 215, such that the absorber product stream 215 has a desired operating temperature once it reaches the ammonia reactor 218. The absorber product stream 215 flows from the pre-heater 216 to the ammonia reactor 218. The ammonia reactor 218 includes a catalyst (for example, an iron-based catalyst) that accelerates the reaction between hydrogen and nitrogen to produce an ammonia reactor product stream 217 that includes ammonia (Equation 4). The ammonia reactor product stream 217 can also include unreacted gas (hydrogen, nitrogen, or both).

$$3H_2 + N_2 \rightarrow 2NH_3 \Delta H = -46 \text{ kJ/mol} \tag{4}$$

The ammonia reactor product stream 217 flows to the second condenser 220. The second condenser 220 cools the ammonia reactor product stream 217 and causes the ammonia in the ammonia reactor product stream 217 to condense. The liquid portion 217a of the ammonia reactor product stream 217 exits the second condenser 220 and flows to the ammonia storage vessel 224. The vapor portion 217b of the ammonia reactor product stream 217 includes unreacted hydrogen and/or nitrogen and exits the second condenser 220 and flows to the third compressor 222. The third compressor 222 increases the pressure of the vapor portion 217b, such that the vapor portion 217b has the desired operating pressure once it reaches the ammonia reactor 218. The vapor portion 217b can be recycled to the ammonia reactor 218. For example, the vapor portion 217b mixes with the absorber product stream 215 downstream of the second compressor 214 and upstream of the pre-heater 216. The pre-heater 216 can increase the temperature of the vapor portion 217b, such that the vapor portion 217b has the desired operating temperature once it reaches the ammonia reactor 218.

Figure 3:
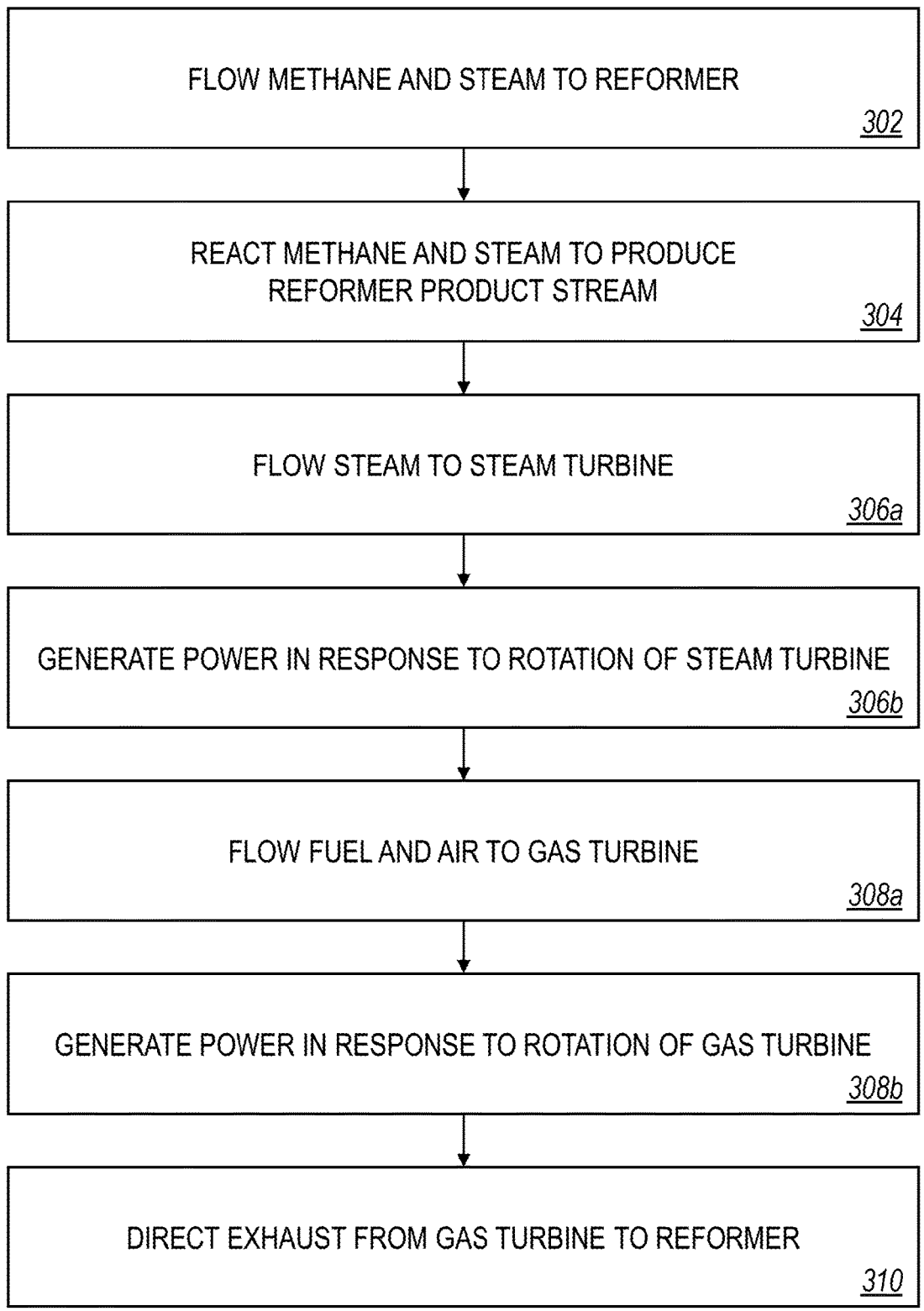
FIG. 3 is a flow chart of an example method for integrating a combined cycle power generator with a reformer.

FIG. 3 is a flow chart of a method 300 for integrating a combined cycle power generator (102) with a reformer (202). At block 302, methane and steam is flowed to the reformer 202. At block 304, the methane and steam are reacted by the reformer 202 to produce a reformer product stream (203). At block 306a, steam is flowed to a steam turbine (104), thereby causing the steam turbine 104 to rotate. At block 306b, electricity is generated by a power generator (106) coupled to the steam turbine 104 in response to rotation of the steam turbine 104. At block 308a, fuel and air are flowed to a gas turbine (108), thereby causing the gas turbine 108 to rotate. At block 308b, electricity is generated by the power generator 106 coupled to the gas turbine 108 in response to rotation of the gas turbine 108. At block 310, exhaust from the gas turbine 108 is directed, by a switch (114) in a first position, to the reformer 202 to provide heat to the reformer 202. The switch 114 can be adjusted from the first position to a second position, thereby directing, by the switch 114 in the second position, exhaust from the gas turbine 108 to a water boiler (110) to provide heat to the water boiler 110. Steam can be generated by the water boiler 110 in response to receiving heat via the exhaust from the gas turbine 108.

Figure 4:
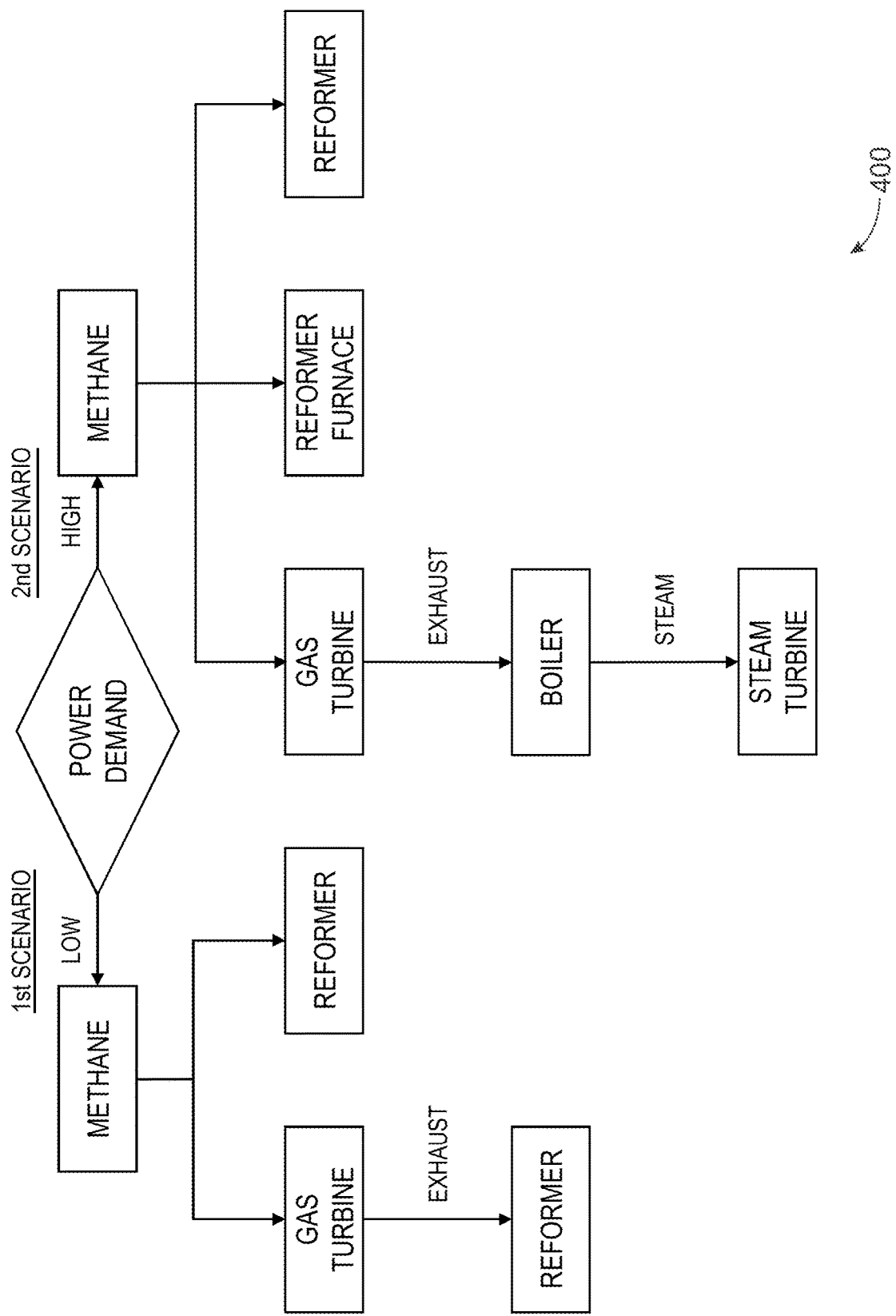
FIG. 4 is a flow chart of an example method for integrating a combined cycle power generator with a reformer.

FIG. 4 is a flow chart of a method 400 for integrating a combined cycle power generator (102) with a reformer (202). In a first scenario, the power demand is low. Fuel (for example, methane or a mixture of hydrocarbons) flows to a gas turbine (108). The fuel is combusted and flows through the gas turbine 108 to generate power. The exhaust from the gas turbine 108 flows to the reformer 202 to provide heat. Methane is flowed to the reformer 202, for example, mixed with steam as feed for the methane reforming process (Equation 1). As mentioned previously, the methane reforming process is endothermic, so the reformer 202 needs heat input to maintain a desired operating temperature range. The exhaust from the gas turbine 108 can be a source of heat to the reformer 202. In the first scenario, the steam turbine (104) can be disconnected from the combined cycle power generator 102.

In a second scenario, the power demand is high. Fuel (for example, methane or a mixture of hydrocarbons) flows to the gas turbine 108. The fuel is combusted and flows through the gas turbine 108 to generate power. The exhaust from the gas turbine 108 flows to a boiler (110) to generate steam (113). The steam 113 flows to a steam turbine (104) to generate additional power. Fuel (for example, methane or a mixture of hydrocarbons) flows to a furnace of the reformer 202 and is combusted to produce heat. Methane is flowed to the reformer 202, for example, mixed with steam as feed for the methane reforming process (Equation 1). As mentioned previously, the methane reforming process is endothermic, so the reformer 202 needs heat input to maintain a desired operating temperature range. The combustion of the fuel flowing to the furnace of the reformer 202 can be a source of heat to the reformer 202.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    flowing methane and first steam to a reformer;
    reacting, by the reformer, the methane and the first steam to produce a reformer product stream comprising carbon monoxide and hydrogen;
    flowing second steam to a steam turbine, thereby causing the steam turbine to rotate;
    generating, by a power generator coupled to the steam turbine, electricity in response to rotation of the steam turbine;
    flowing fuel and air to a gas turbine, thereby causing the gas turbine to rotate;
    generating, by the power generator coupled to the gas turbine, electricity in response to rotation of the gas turbine; and
    directing, by a switch in a first position, exhaust from the gas turbine to the reformer to provide heat to the reformer, wherein the switch is configured to be adjusted into at least the first position, a second position, and a third position,
        wherein adjusting the switch into the second position directs the exhaust from the gas turbine to a water boiler to provide heat to the water boiler,
        wherein adjusting the switch into the third position directs a first portion of the exhaust to the water boiler and a second portion of the exhaust to the reformer to provide heat to the water boiler and the reformer.

2. The method of claim 1, comprising:
    adjusting the switch from the first position to the second position, thereby directing, by the switch in the second position, the exhaust from the gas turbine to the water boiler to provide heat to the water boiler; and
    generating, by the water boiler, steam in response to receiving heat via the exhaust from the gas turbine.

3. The method of claim 2, wherein:
    the reformer product stream comprises methane;
    the reformer comprises a reformer reactor and a second water boiler; and
    the method comprises:
        flowing the reformer product stream from the reformer reactor to the second water boiler to provide heat to the second water boiler; and
        generating, by the second water boiler, steam in response to receiving heat via the reformer product stream from the reformer reactor.

4. The method of claim 3, wherein the switch comprises a baffle, and adjusting a position of the switch comprises swinging the baffle between the first position and the second position.

5. The method of claim 3, wherein:
    the switch comprises a first gate and a second gate;
    adjusting the switch to the first position comprises:
        closing the first gate to obstruct a flow path between the gas turbine and the water boiler to prevent fluid from flowing from the gas turbine to the water boiler; and
        opening the second gate to allow fluid to flow in a flow path between the gas turbine and the reformer; and
    adjusting the switch to the second position comprises:
        opening the first gate to allow fluid to flow in the flow path between the gas turbine and the water boiler; and
        closing the second gate to obstruct the flow path between the gas turbine and the reformer to prevent fluid from flowing from the gas turbine to the reformer.

6. A system comprising:
    a reformer configured to react methane with steam to produce a reformer product stream comprising carbon monoxide and hydrogen;
    a gas turbine configured to rotate in response to receiving a mixture of fuel and air;

a power generator coupled to the gas turbine, the power generator configured to convert rotational energy from the gas turbine into electricity;
a switch configured to variably control:
   an amount of a first portion of the exhaust from the gas turbine to be directed to the reformer to provide heat to the reformer;
   an amount of a second portion of the exhaust from the gas turbine to be directed to a first water boiler to provide heat to the first water boiler; and
   a second amount of the first portion and a second amount of the second portion at the same time;
the first water boiler configured to generate steam in response to receiving heat via the second portion of the exhaust from the gas turbine; and
a second water boiler disposed within the reformer, the second water boiler configured to receive heat from at least one of the reformer product stream or the exhaust from the gas turbine and use the received heat to generate steam.

\* \* \* \* \*